US007822344B1

(12) United States Patent
Jachetta et al.

(10) Patent No.: US 7,822,344 B1
(45) Date of Patent: Oct. 26, 2010

(54) SYSTEM FOR COMMUNICATION OF VIDEO, AUDIO, DATA, CONTROL OR OTHER SIGNALS OVER FIBER IN A SELF-HEALING RING TOPOLOGY

(75) Inventors: Vincent Jachetta, Locust Valley, NY (US); Brian C. Moore, Smithtown, NY (US); James G. Jachetta, Locust Valley, NY (US); Francis P. Jachetta, Oyster Bay, NY (US)

(73) Assignee: Multidyne Electronics Inc., Locust Valley, NY (US)

( * ) Notice: Subject to any disclaimer, the term of this patent is extended or adjusted under 35 U.S.C. 154(b) by 1305 days.

(21) Appl. No.: 11/239,841

(22) Filed: Sep. 30, 2005

Related U.S. Application Data (60) Provisional application No. 60/615,383, filed on Oct. 1, 2004.

(51) Int. Cl.
*H04J 14/00* (2006.01)

(52) U.S. Cl. .............................. 398/67; 398/66; 398/70; 398/71; 398/154

(58) Field of Classification Search .................. 398/33, 398/66, 70, 71, 72, 5, 10, 59, 67, 69, 154; 348/159

See application file for complete search history.

(56) References Cited

U.S. PATENT DOCUMENTS

| 5,724,347 | A | * | 3/1998 | Bell et al. | 370/377 |
|---|---|---|---|---|---|
| 6,008,867 | A | * | 12/1999 | Cooper et al. | 348/705 |
| 6,025,874 | A | * | 2/2000 | Cooper et al. | 348/159 |
| 6,061,089 | A | | 5/2000 | Tonkin et al. | |
| 6,084,631 | A | | 7/2000 | Tonkin et al. | |
| 6,684,030 | B1 | * | 1/2004 | Taylor et al. | 398/59 |
| 6,738,582 | B1 | * | 5/2004 | Moshe et al. | 398/98 |
| 7,027,733 | B2 | * | 4/2006 | Feuer et al. | 398/72 |
| 7,200,868 | B2 | * | 4/2007 | Mattox et al. | 726/26 |
| 7,369,780 | B2 | * | 5/2008 | Alexander et al. | 398/183 |
| 2001/0010694 | A1 | * | 8/2001 | Lindsey et al. | 370/405 |
| 2002/0077788 | A1 | * | 6/2002 | Ohashi et al. | 702/188 |
| 2002/0171741 | A1 | * | 11/2002 | Tonkin et al. | 348/211.3 |
| 2003/0221003 | A1 | * | 11/2003 | Storry et al. | 709/224 |
| 2004/0117840 | A1 | * | 6/2004 | Boudreau et al. | 725/98 |
| 2004/0233983 | A1 | * | 11/2004 | Crawford et al. | 375/240.01 |
| 2004/0255333 | A1 | * | 12/2004 | Kenworthy | 725/129 |
| 2006/0202964 | A1 | * | 9/2006 | Liaw et al. | 345/168 |

* cited by examiner

*Primary Examiner*—Ken N Vanderpuye
*Assistant Examiner*—Hibret A Woldekidan
(74) *Attorney, Agent, or Firm*—Ryan, Mason & Lewis, LLP (57) ABSTRACT

A system for communication of signals between remote devices and monitoring and control devices via fiber. The system in accordance with one aspect of the invention includes a plurality of remote interface units each coupled to a corresponding one of the remote devices, and a base unit coupled to the one or more monitoring devices and the one or more control devices. The plurality of remote interface units and the base unit are interconnected by fiber optic links to form a ring. Each of the remote interface units supplies a video signal to the base unit for distribution to the one or more monitoring devices, and the base unit supplies control signals from the one or more control devices to the plurality of remote interface units.

19 Claims, 8 Drawing Sheets

SYSTEM FOR COMMUNICATION OF VIDEO, AUDIO, DATA, CONTROL OR OTHER SIGNALS OVER FIBER IN A SELF-HEALING RING TOPOLOGY

CROSS-REFERENCE TO RELATED APPLICATION(S)

The present application claims the priority of U.S. provisional application Ser. No. 60/615,383, filed Oct. 1, 2004.

The present application is also related to commonly-assigned U.S. patent application Ser. No. 11/056,466, filed Feb. 11, 2005 and entitled "System for Communication of Video, Audio, Data, Control or Other Signals over Fiber," which is hereby incorporated by reference herein.

FIELD OF THE INVENTION

The present invention relates generally to communication systems, and more particularly to surveillance or broadcast video systems, or other types of systems for communicating video, audio, data, control or other signals over fiber.

BACKGROUND OF THE INVENTION

Conventional surveillance or broadcast video systems are deficient in a number of different respects. For example, the conventional systems fail to provide a mechanism for combining a multiplicity of digitally encoded sources into a single data stream without the use of special reclocking or data-rate converter equipment or circuits. Such elements are required in order to accommodate the differing data rates of the various sources, or, if all sources are encoded at the same data rate, path-length differences and thus phase differences between sources.

Also, there does not exist today an all-in-one system capable of self-healing functionality that can directly accept and transport video, audio, camera control, and data signals simultaneously without adding additional devices to convert standard video such as NTSC, PAL, SDI and audio formats such as AES-EBU, SPDIF, balanced or unbalanced analog, and data formats such as RS232, RS422, etc., into a single protocol that is compatible with high speed serial digital transport over fiber optics.

Conventional surveillance or broadcast video systems also lack a built-in video test signal generator with multiple patterns at the source for performance verification and various system alignment tasks. Often, if a test signal is present, it is usually within the source itself, and limited to one pattern such as color bars. This is insufficient for all the tests that might need to be performed on the system.

Furthermore, the conventional systems also exhibit significant latency between the video image and the camera pan, tilt and zoom controls. Due to the latency, the user has difficulty controlling the pan, tilt and zoom functions of the camera system. The user executes a command to move a camera, but the system exhibits significant delay before movement is preserved on the video monitor. The latency causes the user to overcompensate all camera movements.

Accordingly, there is a need in the art for a high quality, flexible and inexpensive long distance fiber optic communication and control system for simultaneous transport of multiple broadcast or surveillance video streams from distant sources that maintains a digital format, but in uncompressed form, from input to output and that provides a means for testing and performance validation, while also supporting self-healing functionality.

SUMMARY OF THE INVENTION

The present invention overcomes one or more of the above-noted problems by providing, in an illustrative embodiment, a system for multiplexing and digital transmission of remote video and audio sources, such as cameras, and for bidirectional digital serial communication and control of these remote sources, such as camera pan/tilt/zoom (PTZ), over fiber optic cable, for surveillance or broadcast applications. In the illustrative embodiment, the system is particularly well suited for use in controlling a multiplicity of remote cameras in a surveillance or television broadcast scenario, with PTZ control and support for audio and data communications with each camera location. The remote camera locations might be along a highway for traffic surveillance, or in various locations at a sporting event for broadcast applications. Two-way audio communication can also be supported, for such applications as motorist aid call boxes in the traffic surveillance system, or as program audio feeds or cameraman intercoms in a broadcast scenario. In this embodiment, the remote units only accept video but do not display it; and the base only displays video but does not accept it. However, the concept can be expanded to support video in both directions as needed.

The system may comprise, by way of example, multiple remote interfaces, which connect each camera or other video source, in the form of a ring topology, via a single fiber optic cable, over a distance of up to several kilometers. Audio and data can also be accommodated. A base unit is one of the units on the ring, and it is used to select, control and receive content from each of the remote units. Up to N remote interfaces can be accommodated, where N is an arbitrary number dependent on the particular system implementation. The remote units can also be referred to as add/drop units, because they can extract signals from the ring, and then either replace these signals in the ring's data stream with new signals originating locally, or simply pass the incoming signals from the ring on to the next unit. This new content is then transported along the ring through the other remote units until it gets to the base unit. In this way, two-way communication can be established, between any remote unit and the base or between any two remote units, or the signal can be broadcast to other units. Analog video from the source is digitized and passes from each remote along the ring until it arrives at the base unit, and bi-directional audio, data and control signals pass to and from each remote interface device and the base unit.

The base unit separates and converts the video signals from the remote units into standard analog format, and these signals are each available simultaneously on separate outputs. Likewise, it separates the audio and data from each remote unit and makes these available simultaneously. In the case of the data, standard serial digital interfaces, in protocols such as RS232, RS422, or RS485, selectable by the user, are supported. In the case of the audio, digital audio formats or analog audio can be supported. As these data and audio interfaces are bidirectional, the base also combines audio, data and control signals input to them into a single stream for transmission along the ring, where they are separated at each remote interface according to the address of each remote unit. The fiber optic links are bidirectional, allowing simultaneous passage of signals in each direction over the cable, using a different wavelength for each direction. For highest possible quality, the audio and video are preferably transported in uncompressed form.

The illustrative embodiment is advantageously configured to provide a self-healing function, utilizing the bidirectionality of the fiber optic ring on which all the units reside. Should a break occur the units on either side of the break will sense that the flow of data is interrupted. They can then take advantage of the bidirectionality of the ring to loop the data back towards the base so that the system now becomes two bidirectional branches originating from the base instead of a ring.

The remote interface units may also include a video test signal generator for testing and performance validation of the system. For example, an arrangement can be provided in which a number of test patterns, such as up to 15 test patterns, plus normal video, can be selected from the base.

DETAILED DESCRIPTION OF THE INVENTION

The present invention in an illustrative embodiment to be described below provides a system for multiplexing and digital transmission of signals from remote video sources, such as cameras, bidirectional audio, and for bidirectional digital serial communication and control of these remote sources, such as camera PTZ, over fiber optic cable, for surveillance, broadcast television, or other applications. It is to be appreciated, however, that the invention can be implemented in a wide variety of other system configurations, in order to meet the particular needs of a given application.

As will become apparent, a communication and control system is described which provides real time bidirectional communication and control of a plurality of remote devices, such as video cameras, and which also combines video signals from such sources into a single stream with an available backup stream in a self-healing ring topology for transmission over a single link for separation and display at the receiving end.

The present invention in the illustrative embodiment provides a high-speed serial digital communication and control system, and corresponding methods of operation, for use in surveillance or broadcast applications. The illustrative embodiment allows real time control of cameras or other input/output devices. The digital transmission of video data has more noise immunity and less distortion than conventional analog systems. Since this embodiment does not compress the digitized video, there are no motion artifacts or loss of image quality. However, the concept does allow for adding provisions to transport compressed video. The illustrative embodiment uses fiber optic cables, which allow for an increase in the distance between remote units and the base unit, allows for easy mixing of different camera types and provides the option of system expansion by adding additional remote interfaces and corresponding video sources. The illustrative embodiment allows the simultaneous transport of a plurality of remote video sources.

In particular, the present invention in the illustrative embodiment provides a vision control system using high-speed serial digital transmissions. The system comprises two primary types of components, namely, a plurality of remote interface units, or heads, and a base unit, interconnected in a ring topology.

Each remote head receives, over the fiber optic ring cable, digital data and control signals from the base, selects the data and/or control signals that are assigned to it, and outputs these to control the remote source and/or convey data to an end user there. Each remote interface unit also accepts and converts an analog video signal into digital data for transmission over the fiber optic ring cable to the base unit. This remote interface also accepts digital data signals, if present, from a source, or an end user there, and combines these with the digital stream that includes the above video. These data signals could also include status information such as video present or system health. The remote unit can substitute this local content for the content that it received in the stream from the base, thus establishing two-way communication, or, it can simply pass the incoming stream along to another remote unit. Each remote head also has a programmable cable equalizer circuit, to compensate for long coaxial cable runs from the analog video source to the remote head. In this way, high frequency roll-off due to cable losses can be compensated for. The equalizer can be bypassed for short cable distances.

The base unit separates the multiplexed data and video signals from the remote interfaces into individual video and data for output to individual interfaces; one associated with each remote interface, and accepts uplink data and control signal inputs at each interface, for combination via time division multiplexing into a signal for re-transmission along the ring to all the remote units. Each unit will recognize and separate out the data intended for it.

In addition to the combined data and control signals that are destined for the individual remote heads, the uplink stream from the base also has embedded within it, a master clock signal derived from a master clock source in the base. This is used to reconstruct a replica of the master clock in each remote head, so that all clocks throughout the system are frequency locked, and any video signals that are digitized at the heads can be combined digitally at the base without the problems with regard to clock frequency differences mentioned previously herein. Thus, the video can be kept in digital format and transported and recovered with little or no overhead because the system is completely synchronous. If digital video is to be encoded at any given head, a frame synchronizer can be implemented to synchronize the video data with the system clock. The system clock can be set to a multiple of any digital video format to simplify the video data synchronization. In this case a simple phase synchronization scheme can be implemented.

The uplink stream also has embedded within it, reference signals that enable each remote head, to locate within the stream the uplink data and control signals destined for it. In this way each head can be accessed individually and simultaneously. Each head can be, programmed to capture data and/or control from any one of the interfaces at the base. The streams uplinked from the base to the heads, can be all identical (i.e., they are the same signal, with content intended for each head packaged in the form of packets with unique addresses). This has the advantage of allowing an individual head to be moved from port to port on the ring without having to reprogram that head, unlike other systems which may assign a remote head to one port only.

The uplink stream also contains a command word to enable the built in video and audio test signal generator in each remote head, and to select one of 15 test patterns contained therein. In this way, tests for frequency response, signal to noise, linearity, differential phase and gain, and others can be carried out on the system. A character generator can be implemented for video source identification. An audio announce or playback system can be implemented for audio source identification. A bit error rate test generator can be implemented to test the data transport integrity of the system.

The system is designed to be completely transparent to any serial data protocol that the user may choose to input or output from the various data interfaces on the base unit or remote interfaces, as long as the data has a baud rate of less than M MHz, where M is an arbitrary number dependent on the particular system implementation. This is because the user data is handled in much the same way as an analog signal, converted to digital by feeding it to a 1-bit analog to digital converter with a sampling rate of M MHz. In this case, however, the analog to digital converter is actually a comparator whose threshold is programmed to be compatible with standards such as RS232, RS422, RS485, and others. The output of the comparator is sampled by a flip flop with clock frequency of M MHz. Slicing the signal up in this way enables it to be time division multiplexed with other data streams in much the same way as the video signals, so that it can be transported simultaneously over a single fiber with other multiplexed signals. The streams have reference signals embedded within them so that the data and video components can be demultiplexed at the other end and routed to the proper destinations. The reference signal is added to the composite data signal after the multiplexing has been carried out; i.e., it is not added to any of the user signals themselves before the multiplexing process.

The system can handle control protocols for a multiplicity of camera types, because it is transparent to them. Unlike other systems, the invention does not require a microcontroller or any other form of software, firmware or intelligence to manage user data or prior knowledge of the protocol of that data in order to packetise it or to add signal management content to it, such as address bits, data type bits, start and stop bits, so that it can be routed to, and extracted by, a specific location. The time-division multiplexing of the raw user data and the broadcast nature of the multiplexed data combined with a reference signal for time-division demultiplexing and extraction of data by the intended destination, ensures a simple, low cost, transparent means of data communication. It will be apparent to anyone skilled in the art that, except for possible system health monitoring functions and possible user interface schemes, this is a completely "hardware-based" system.

Figure 1:
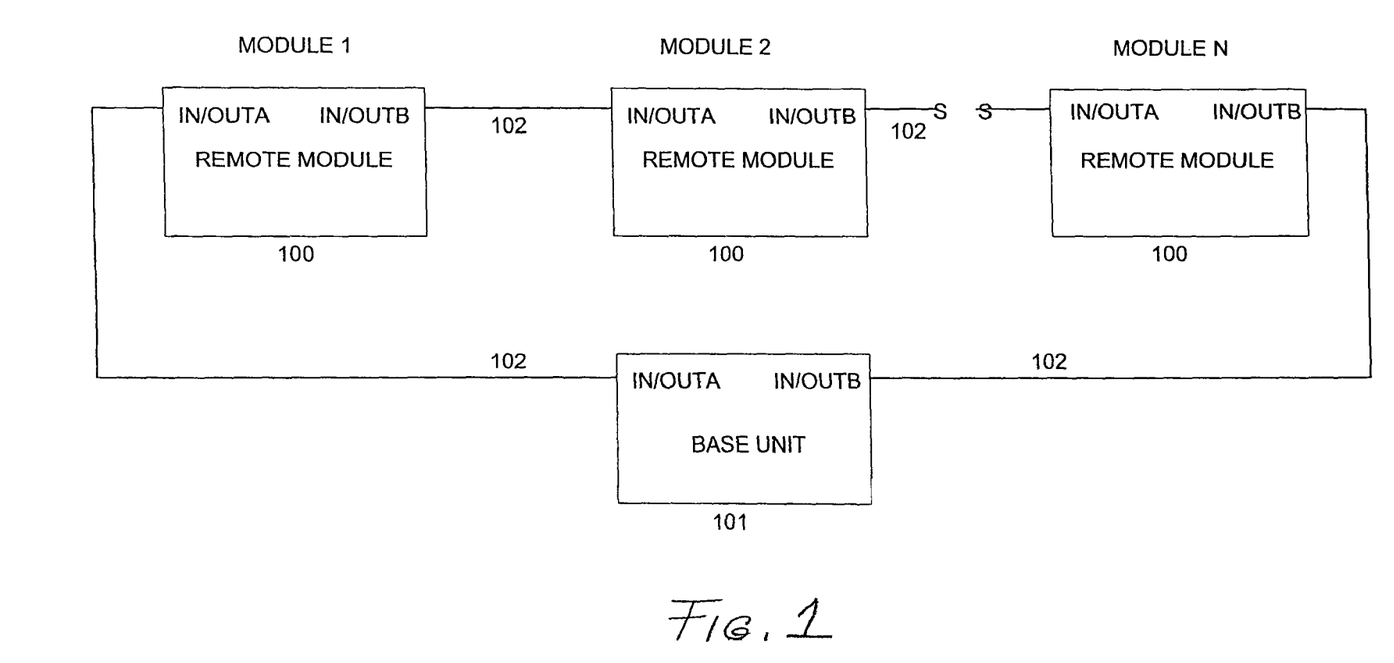
FIG. 1 is a block diagram showing how the remote units and base unit are interconnected in an illustrative embodiment of the invention.

Referring to FIG. 1, an overall block diagram of the system of the illustrative embodiment is provided, showing the ring topology of up to N remote units 100 and the base unit 101 connected by fiber optic cable 102. Of course, the connection could be by other means, such as twisted pair cable, etc. In this embodiment, it is assumed that the video is uncompressed, although that is not a requirement of the invention.

Figure 2:
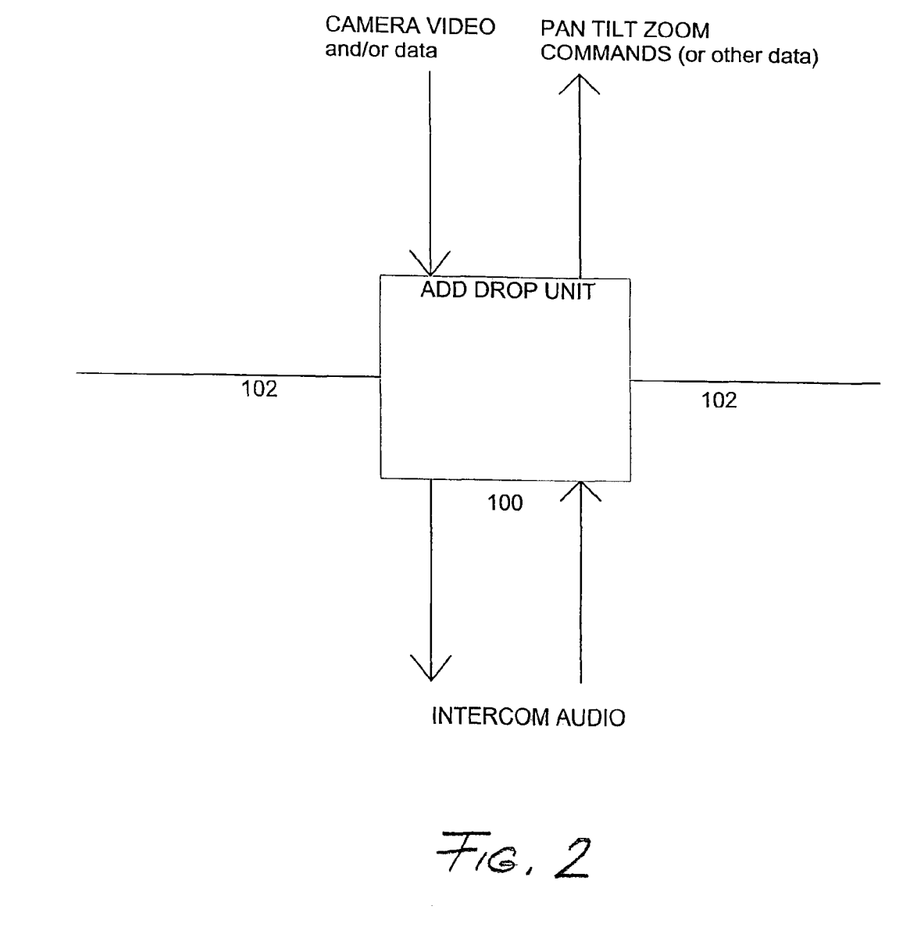
FIG. 2 is a diagram of a remote unit showing its connections to the system.

FIG. 2 shows how one of the N remote units connects in a typical application such as a highway surveillance system. Here the remote unit 100 accepts video from a surveillance camera and outputs PTZ commands to it. These commands originate from the base unit 101 and the video is destined for the base unit as well. It can also input and output other forms of digital data, in this case these may include, but are not limited to, camera status and other camera commands such as white balance, color temperature, etc. The data could also be used to program and control digital signage, etc. The remote unit also supports audio, here in the form of a 2-way intercom system. In this application, the audio communication would be between the remote unit 100 and the base 101, and could take the form of a motorist aid call box or other type of communication device.

Figure 3:
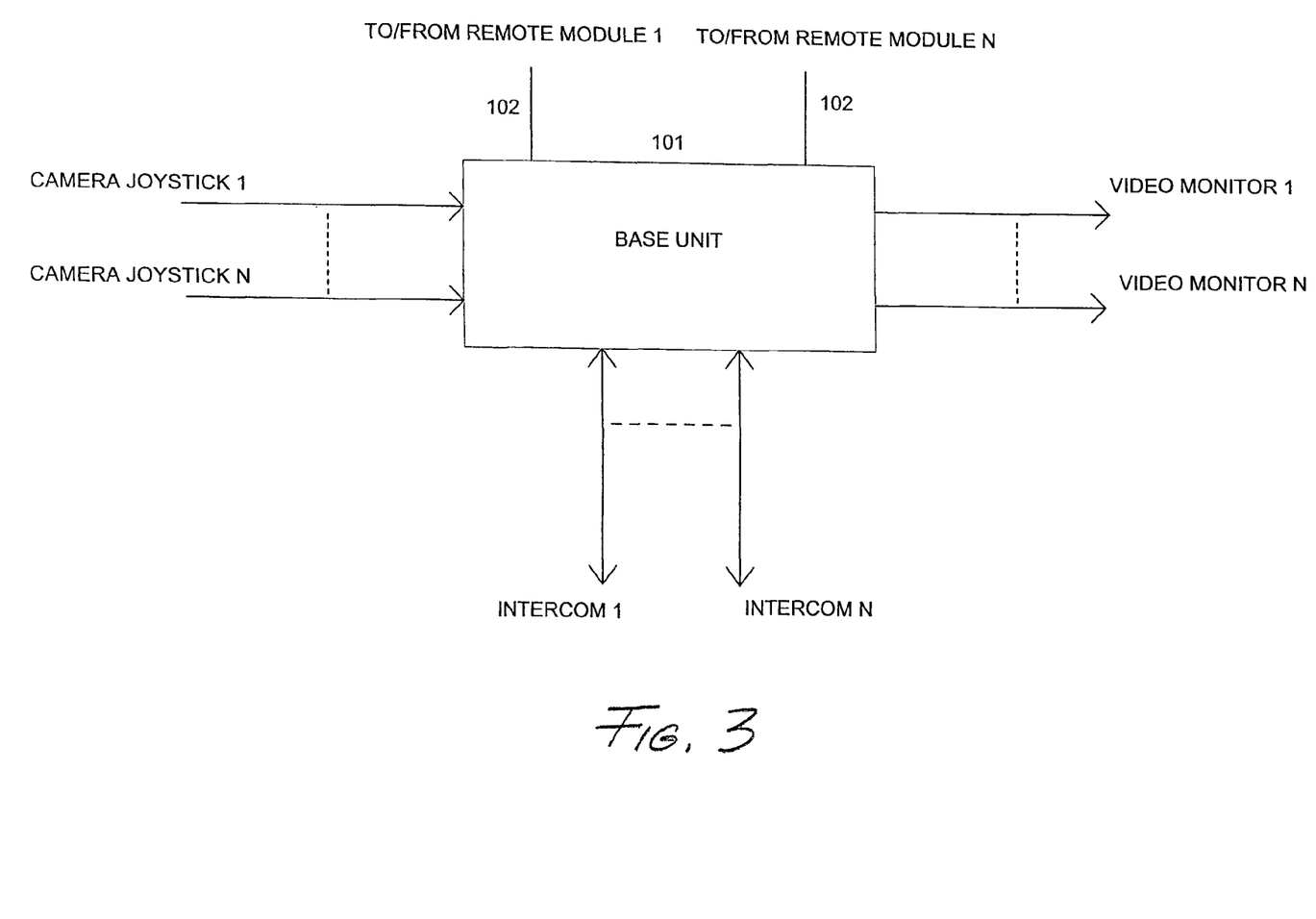
FIG. 3 is a block diagram of the base unit showing its connections to the system.

FIG. 3 shows how the base unit 101 connects in a typical application such as a highway surveillance system. Here the base unit separates the video and audio from the incoming signal stream over fiber 102 from the N remote units 100 into individual display and speaker ports, and combines N PTZ joystick control inputs and microphone inputs into another signal stream over fiber 102 for transmission along the ring where each remote unit 100 will separate out the signals intended for it, ignoring the others. The signal over the fiber 102 is arranged such that the content intended for the remote units is arranged in a string of data packets, one for each remote unit, much like a string of boxcars. The base unit assembles this string from the N sets of microphone and joystick inputs.

When the string gets to a remote unit 100, that remote unit selects the packet intended for it and extracts its content, in this case the PTZ commands for the camera and the audio for the motorist call box speaker. It could also include a video test signal to test the video circuitry in the remote unit. It can then either pass the packet along or add content of its own; in the case depicted here this would be camera video and microphone audio from the call box, and possibly any camera or system status data. When the string of packets reaches the base 101 once again, the base unit routes each packet to the monitor and audio output that is associated with the corresponding remote unit.

Figure 4:
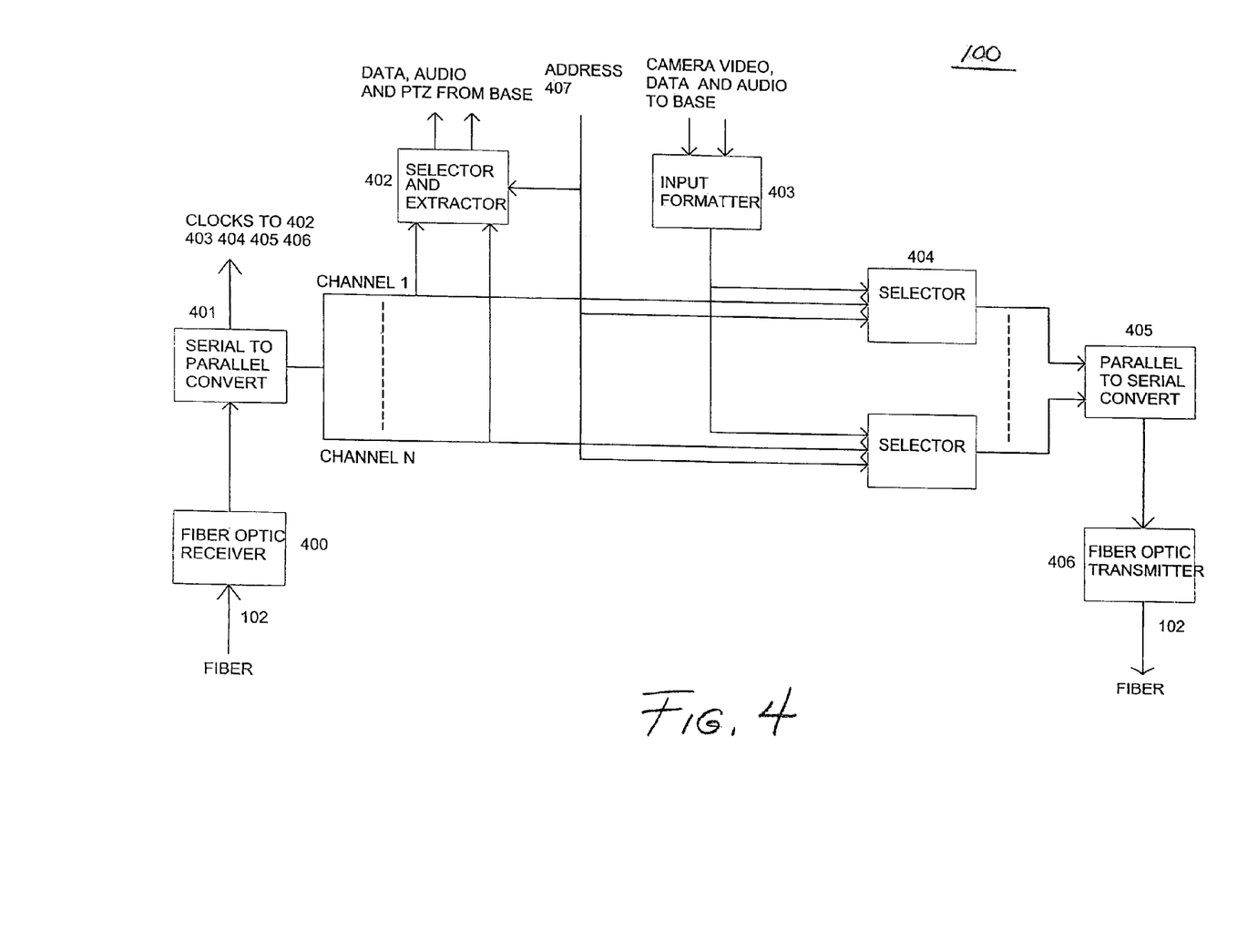
FIG. 4 is a more detailed drawing of the remote unit.

FIG. 4 shows a more detailed view of the remote unit 100, also referred to as an "add/drop" unit because it can substitute its own content in the stream for the content packet that is intended for it. The incoming signal enters over fiber optic cable 102 at the lower left of the diagram and enters a fiber optic receiver circuit 400 that converts the light into electronic signals. This circuit 400 could be part of a fiber optic transceiver module that also includes fiber optic transmitter 406, but here they are shown separately for clarity. From 400 the signal goes to a serial to parallel converter unit 401 that separates the serial signal stream of signal packets into N individual packet streams that are normally assigned to respective ones of the N individual remote units 100. The individual packet streams are presented simultaneously so that they can be selected by any unit 100 on the ring. In this way, a unit could be moved to a different position on the ring and still obtain content intended for it. It also allows any unit to communicate with any other unit, because any unit can access the stream assigned to any other unit.

Clock signals to drive the circuitry of the remote unit are also extracted from the incoming stream by 401. It is well known by those skilled in the art how this could be carried out. This also allows the remote unit to be slaved to a master clock in the base unit, so that the above-noted features regarding handling of digitized signals can be realized. The selection and extraction is made by the circuit 402. The selection can be controlled by an address 407 that can either be set manually by switches, or by an address read from a special packet intended for that purpose. In this application, circuit 402 extracts and presents the call box speaker audio and camera PTZ data, plus any video test signals, if present.

The video from the camera and microphone audio from the call box, plus any status data is formatted into packet form for insertion into the serial stream by circuit 403. Here again the output of 403 may be inserted into any of the N individual packet streams to ensure the flexibility described above. The circuits that carry out the insertion are selectors 404. These can choose, for each of the N streams, either the corresponding incoming stream from 401 or the output of 403. Here again the choice is governed by the same address 407 described above. The outputs of the N selection circuits 404 are sent to a serialize circuit 405 that arranges the N packet streams into a serial string in the above-described boxcar fashion. It also embeds the clock into the stream so that the next unit on the ring can extract it and slave to it as well. Again it is well known to those versed in the art how this is carried out. The output of 405 is fed to fiber optic transmitter 406.

Figure 5:
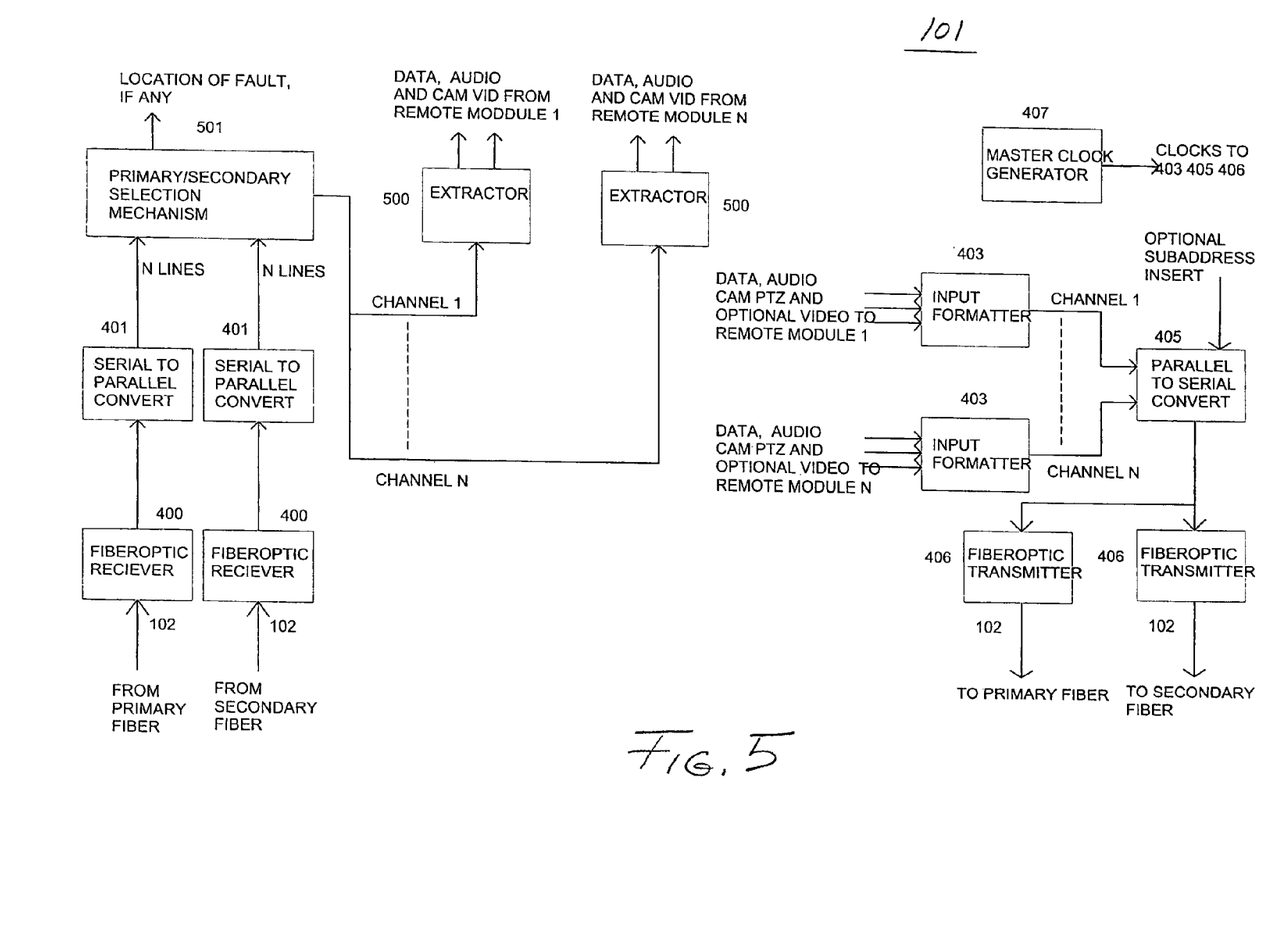
FIG. 5 is a more detailed drawing of the base unit.

FIG. 5 shows a more detailed view of the base unit 101. It should be noted that the base unit 101 also includes elements 400, 401, 403, 405 and 406, which are the same as those in the remote unit previously described in conjunction with FIG. 4. The same reference numbers are used for these common elements of the remote and base units for clarity and simplicity of description, although it should be understood that the reference numbers in FIGS. 4 and 5 denote separate instances of the corresponding elements.

It can be seen from FIG. 5 that the architecture of the base unit 101 is very similar to the architecture of the remote unit 100, except that instead of a selector unit to choose between the N packet streams, which in turn feeds a single extraction unit, there are N extraction circuits 500, to present the camera video, call box microphone audio, and any camera status signals from all N remote units simultaneously. Of course, a circuit similar to 402 could also be used if simultaneous output is not needed, but in a surveillance scenario, it is not unusual to have a console with N video monitors, speakers, microphones, and joysticks installed.

The base unit 101 also includes fiber optic receivers 400 and deserializers 401 identical to those in 100. The base unit also differs from the remote units in that there is no path for the N packet streams to be passed through, because the base unit is both the primary source and destination for all content. Thus there are no selection and insertion circuits like 404. Likewise there are N circuits like 403 to accept PTZ joystick inputs and microphone audio for each of the N remote units from a console such as described above. Optionally, a video test signal could also be fed to each of the N circuits 403. The outputs of these N circuits are fed to serialize circuit 405, which strings the N packets together in boxcar fashion, and fiber optic transmitter 406 which are identical to those in the remote units, except that there are two 406 circuits to illuminate both the primary and secondary fibers. The base unit also differs from the remote units in that there are two sets of fiber optic receivers 400 and deserializers 401. These are utilized to implement the self-healing function.

A selector circuit 501 chooses which of the N outputs of each deserializer gets routed to its corresponding extractor circuit 500. The self-healing process will be described later. In the base unit, the primary receiver 400 can be packaged with the secondary transmitter 406 in one transceiver module, and the secondary receiver 400 can be packaged with the primary transmitter 406 in another transceiver module. These two modules in turn would feed the two fiber optic cables 102 shown emerging from the sides of the base unit 101 in FIG. 1, utilizing different wavelengths of light to support bidirectional traffic on the fiber. It is well known to those versed in the art as to how this is implemented.

Figure 6:
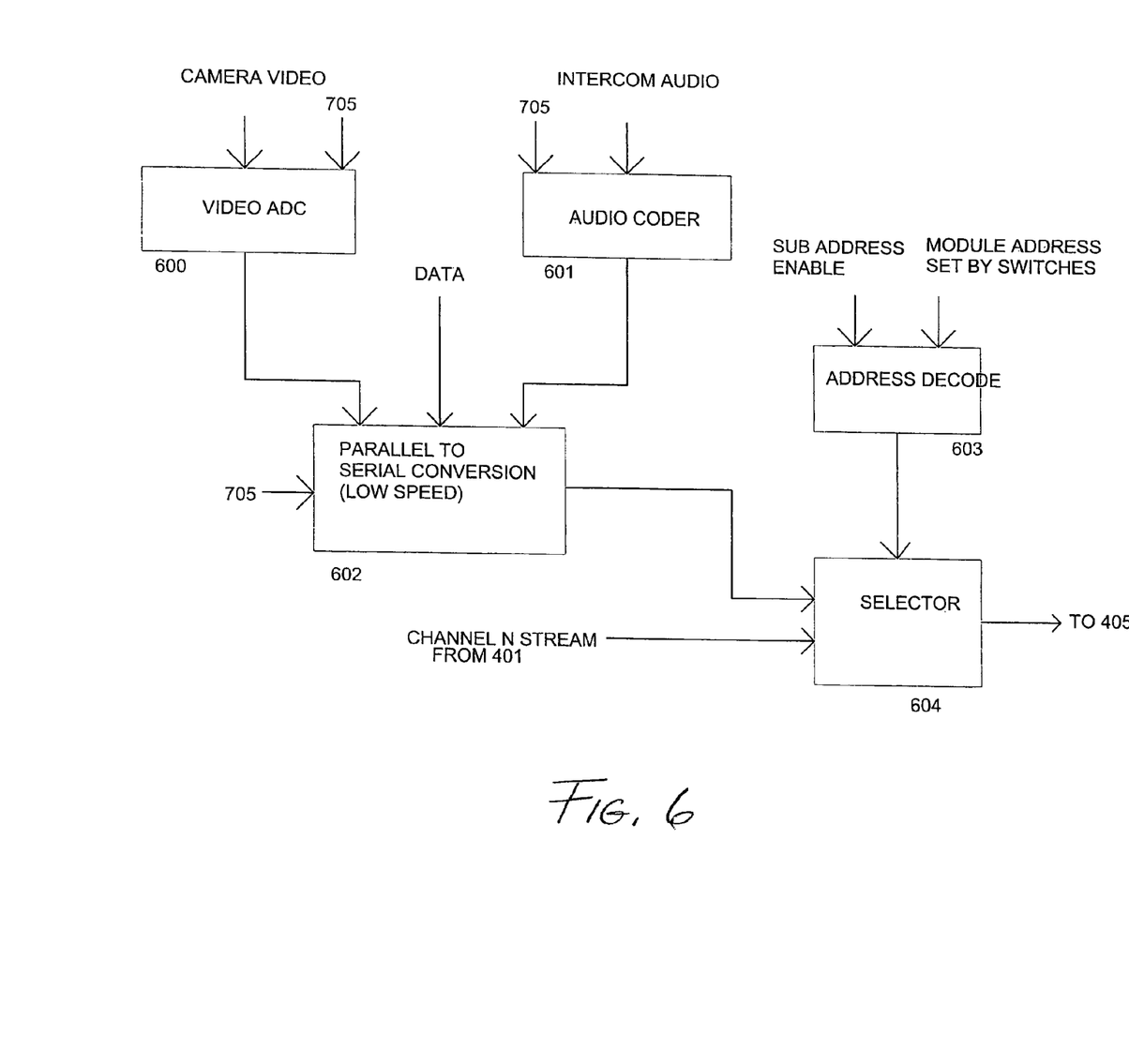
FIG. 6 is a detailed drawing of an exemplary mechanism by which content is input to the remote unit.

FIG. 6 shows a more detailed view of circuits 403 and 404 depicted in FIGS. 4 and 5. Blocks 600, 601, and 602 comprise circuit 403, and blocks 603 and 604 comprise 404. All the circuits get clocks 705 from the serial to parallel circuit 401. There is an analog to digital converter circuit 600 to accept camera video and digitize it. This circuit can also include a cable equalizer to compensate for long cable runs between the video camera and the remote unit 100. Circuits such as 600 are well known to those skilled in the art. There is also an audio coder 601 to digitize microphone audio from the call box. Again, the configuration and operation of such circuits are well known to those skilled in the art.

The digitized outputs of 600 and 601, plus any digital data such as status signals, are fed to a low-speed parallel to serial converter circuit 602 that assembles the video, audio and data into a packet structure. It is referred to as a low speed converter because it operates at a much lower speed than the other converters 401 and 405, typically about N times slower. In the base unit 101 the output of such a circuit would be one of N inputs directly to another parallel to serial converter of type 405. In a remote unit, the output would first go to an array of N selector circuits 404 that would determine which of the N signal streams going through the remote unit it should be inserted into.

The circuits 404 are comprised of 603 and 604 in FIG. 6. There is of course the selector 604 which chooses whether the output of 403 will be substituted for the packet stream from circuit 401 from FIG. 4 or whether the stream will be passed unchanged to the circuit 405. The selection is controlled by the addressing circuit 603 which will enable the substitution if either an address set manually by switches matches one of the N streams in question or if an optional sub-address enable enables it. This optional enable can permit there to be more than N packet addresses, and thus more than N remote units, as each of the N streams can have L sub-addresses. However, only N of the N*L possible addresses and thus remote units can be accessed at one time, because there are only N sets of monitor, audio, data and joystick ports at the base unit. If a remote unit does not have a sub-address that matches the data flowing through it, it will simply pass the stream on to the next unit unaltered. The insertion of the sub-address into the stream takes place at the 405 circuit in FIG. 5.

Figure 7:
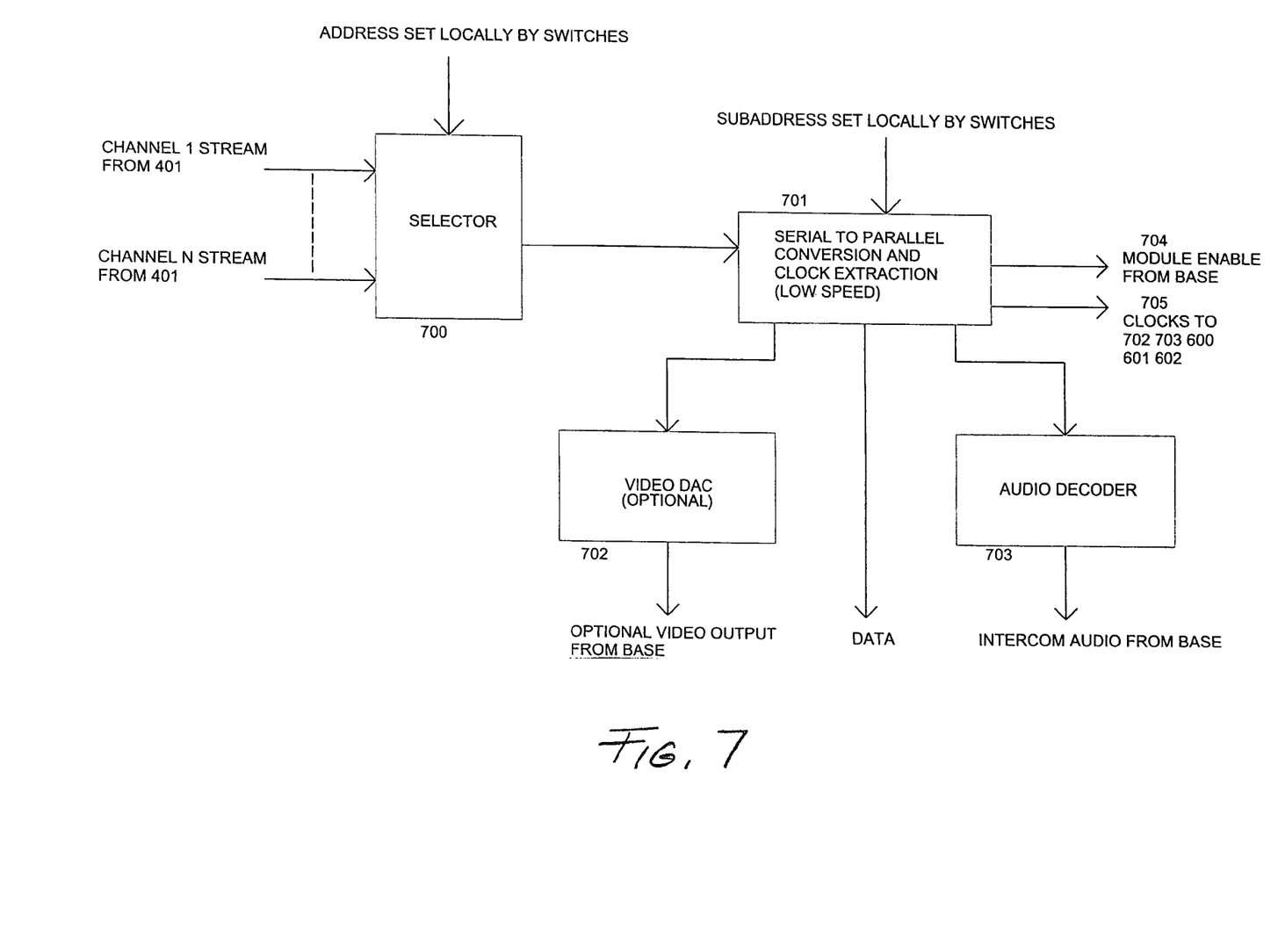
FIG. 7 is a detailed drawing of an exemplary mechanism by which content is extracted from the remote unit.

FIG. 7 shows a more detailed view of the circuits 402 in FIG. 4 and 500 in FIG. 5. Circuit 500 differs from circuit 402 only in that it does not have a packet stream selector 700, as there are N circuits 500 in the base unit, each dedicated to its own 401 circuit output. On the other hand, in the remote unit, there is only one 402 circuit that must be able to access any one of the N outputs of circuit 401. In both circuits there is a low speed deserialize circuit 701 that disassembles the packet into video, audio, data, clock 705, and optional sub-address enables 704 for remote units. The digitized video is routed to a digital to analog converter 702 for output to a video monitor if the circuit is part of the base unit. If it is a remote unit, the video output is optional and may be a test signal. The digitized audio is routed to an audio decoder 703 for output to either a callbox speaker or a console speaker. Data such as camera PTZ for remote units or system status may also be output. In the case of the remote unit, all these outputs are enabled only if the sub-address embedded in the packet stream matches the sub-address setting fed to 701. In the base unit, the outputs are always enabled.

Figure 8:
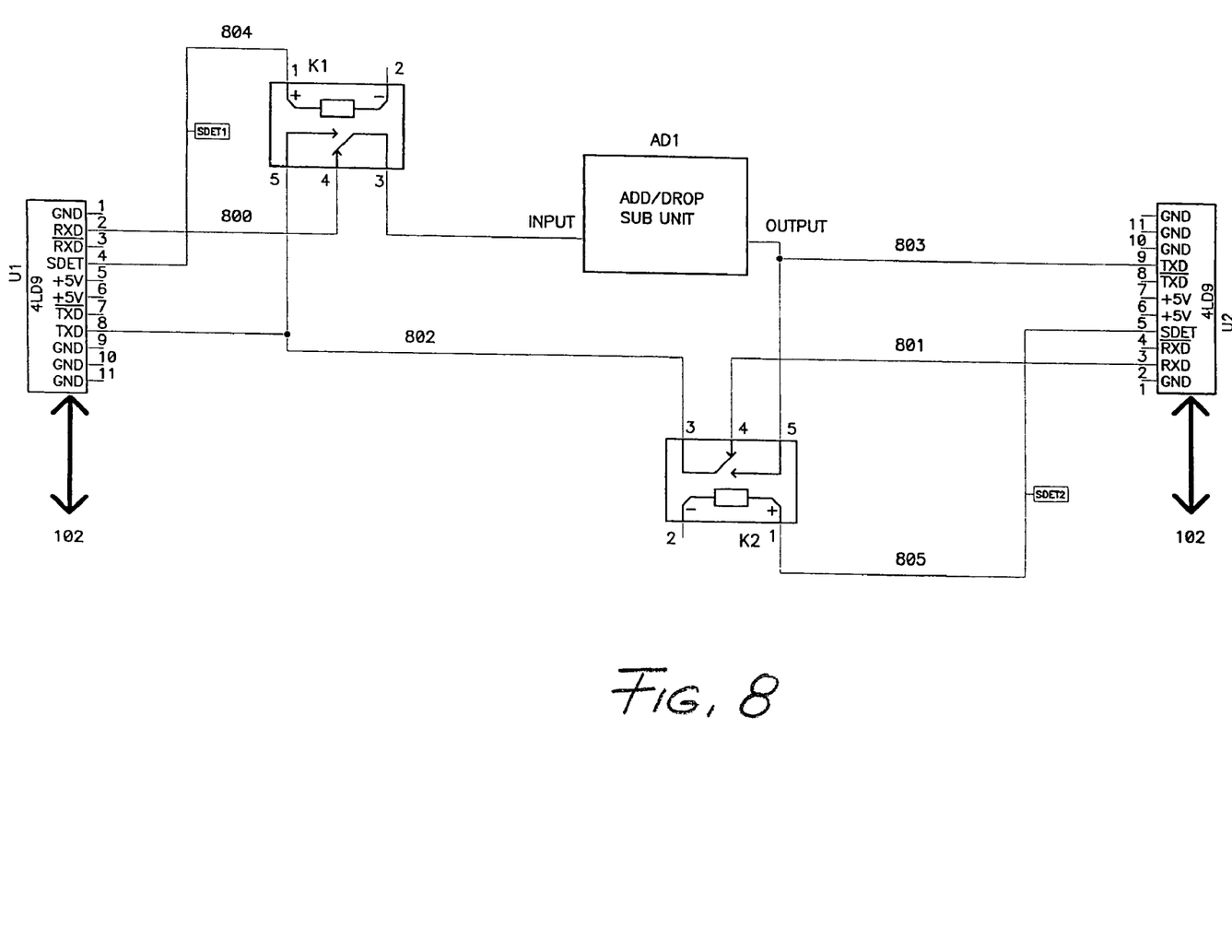
FIG. 8 is a drawing showing the manner in which a self-healing function is carried out in an illustrative embodiment.

FIG. 8 illustrates the operation of the self-healing feature for a remote unit 100. In this diagram, the fiber optic receiver 400 in FIG. 4 makes up the receive portion of the fiber optic transceiver module U1 in FIG. 8 and the fiber optic transmitter 406 in FIG. 4 makes up the transmit half of fiber optic transceiver module U2 in FIG. 8. U1 and U2 are capable of transmitting and receiving fiber optic signals simultaneously on the same fiber. This is possible by using different wavelengths for the two directions. It is well known to those skilled in the art how this is carried out.

The fiber optic transceivers U1 and U2 are available from a number of sources with operating speeds up to but not limited to 10 Gbps with various pin outs and configurations. They are available in two fiber transceiver configurations. They are also available in one fiber transceiver configurations operating at two different wavelengths with an integrated wavelength division multiplexer. By way of example, units U1 and U2 may comprise type 4LD9 transceivers commercially available from Luminent, Inc. Numerous alternative transceiver types may be used. Units U1 and U2 connect to the two fibers 102 emerging from either side of the remote unit 100 in FIG. 1.

Referring again to FIG. 8, the electrical relays K1 and K2 are shown in their normal operation positions. The relays K1 and K2 route the received electrical signals 800 and 801 from U1 and U2 to the add/drop sub unit AD1. The fiber optic ring is bidirectional with data able to flow in both directions. Let us assume that the primary path is left to right and the secondary path is right to left. In this condition the data stream 800 enters the add/drop sub unit AD1 and the data stream 803 leaves the add/drop sub unit AD1 normally. The secondary path, signals 801 and 802 are also illuminated, and carry the same data stream from the base unit as the corresponding signals of the primary path. In the event of a failure in the fiber optic ring from the left to right primary path, the signal detect signal 804 from fiber optic transceiver U1 would cause relay K1 to switch from the default position to form a connection between pins 3 and 5. In this case the secondary data stream 801 from fiber transceiver U2 would be routed through relay K2 to signal path 802 through relay K1 to the add/drop sub unit AD1 INPUT. Continuity of the ring would be maintained via the signal path 801 through relay K2 through signal path 802 and then via fiber optic transceiver U1.

If the right to left secondary ring should fail, the signal detect signal 805 from fiber optic transceiver U2 will switch relay K2 from the default state to the pin 3 to pin 5 connection. This would route the output signal 803 from add/drop sub unit AD1 to the signal path 802 which would then illuminate the secondary fiber optic signal leaving fiber optic transceiver U1. This process would maintain the secondary fiber optic signal path. All these elements were omitted from FIGS. 1 through 7 for clarity. In FIG. 1 and FIG. 8, the fiber optic cable is a two-way device, capable of supporting traffic in both directions on differing wavelengths, but in the other figures, it is depicted as a one-way device for clarity. Coarse and dense wavelength division multiplexing can be implemented to increase the number of optical signals flowing in each direction on the fiber optic ring 102.

As a further illustration, suppose there is a break in the fiber to the left of the remote unit. The signal detect pin of U1 will change state and cause relay K1 to feed the add/drop unit from U2's receive output, so that it now sees the secondary rather than the primary path. Simultaneously the add/drop unit's status circuitry will report that a loss of data occurred. This information can still flow to the right along the ring to the base unit. We now have formed another loop composed of the remote unit in question plus all the remote units to its right, plus the base.

To the left of the break, there will be a remote unit that senses a break to its right. The signal detect of its U2 will cause its K2 to change state such that instead of its U1's transmit side being fed by its U2's receive side, it will now be fed by its add/drop unit's output. The base unit, having been made aware of the break by the status report from the remote on the other side of the break, will now look for the streams coming from all the remote units to the left of the break on the secondary path. In this way, another complete loop is formed consisting of all the remotes to the left of the break plus the base. There is no loss of data and all remote units are still accessible.

The base unit determines where a break occurred and when to look for signals on the secondary fiber as opposed to the primary fiber in the following manner.

In normal operation, when a packet on the primary path passes through the remote unit it is intended for, whether the packet is modified or not, the remote unit will insert a flag into the packet to indicate that it was read. The base unit will read these flag bits when it receives the data at its primary receiver. Should a break occur, the ring will become two smaller loops as described above. The primary receiver will now get downlink packets from the remote units to the right of the break, and, because of the topology of the new loop resulting from the break, instead of downlink packets from the units to the left of the break, it will get uplink packets from the base's secondary transmitter. These will not have the "packet read" flag in them, so the base will know to look for these particular packets at its secondary receiver, because that half of the ring will have formed its own new loop into the secondary receiver. The primary receiver will see that packets from the units to the right of the break will of course have the flag, so they can still be received at the primary receiver.

The selection circuit 501 in FIG. 5 looks at each of the N outputs from the primary deserialize 401 and its corresponding output from the secondary deserialize 401 and selects the one that has the "packet read" flag for forwarding to its corresponding extractor circuit 500. Any combination of flagged and unflagged packet streams can be handled. The number of unflagged vs. flagged packets presented by the primary deserializer will correspond to the position of the break, so it can easily be located for repair. This method works for cases where there are just N remote units without subaddressing. In cases where sub-addressing is used, the base unit would have to attempt to access and look for flags in each of the L sub-addresses in turn within the address N where the break occurred in order to determine the exact location of the break. Since the base transmits the same data at its primary and secondary transmitters 406, both new loops can still be fully accessed.

The present invention may be implemented, by way of illustrative example, in the form of a vision control system for use in a broadcast or surveillance environment using bi-directional high speed serial digital transmission. The system may include a base processing unit that accepts audio, data and/or camera control signals at a plurality of audio, data and/or control interface ports, and combines and transmits these to a plurality of corresponding remote interface units, and that also receives and separates uncompressed video and data signals from these remote interface units and outputs these signals at the corresponding data and/or control interface ports, as well as corresponding video ports. The system may further include a plurality of remote interface units for connecting a camera or other controllable video source, each of which receives audio, data and/or camera control signals from the base unit and which also transmit video, audio and data signals to the base without the need for compression.

Such a vision control system, or other system implementation of the present invention, may include a number of additional elements or features, including by way of example one or more of the following:

1. Support for alternate video formats to include but not limited to serial digital video (SDI), high definition video, digital video (DV), DVI and high resolution graphics (RGB and VGA).

2. A remotely controllable test signal generator in the base unit containing a plurality of video, audio and data test patterns required for carrying out various system tests and bit error analysis.

3. A selectable cable equalizer in each remote interface unit for compensating the effects of long cable runs between the remote interface unit and the analog video source.

4. A composite serial data word broadcast by the base unit to the remote interface units, containing the packetized and addressable audio, control, test and data signals for each of the remote units.

5. Distribution of a master clock signal throughout the system, for the purpose of synchronizing data streams from the remote units so that they can be combined into the serial data word.

6. Embedding of one or more video test signals for distribution to each of the remote units.

7. A self-healing ring topology as well as an ability to locate the position of any fault or faults along the ring.

8. An embedded flag word to determine the location of any fault or faults within the ring topology.

9. An embedded sub-address word to enable accommodating additional remote interface units.

10. The ability to accept, from each remote unit, packetized audio, video, and data signals into assigned positions reserved according to the address for that particular unit, for extraction at the base unit.

Again, it should be emphasized that the particular embodiments described above are presented by way of illustrative example only, and should not be construed as limiting the present invention to any specific embodiment or group of embodiments.

For example, the invention does not require the particular number, type or arrangement of elements, interconnections or signals shown and described in conjunction with the above-described embodiments. Alternative embodiments thus need not incorporate any particular aspect of the arrangements shown in the figures or otherwise described in conjunction therewith. These and numerous other alternative embodiments will be readily apparent to those skilled in the art.

What is claimed is:

1. A system for communication of video signals from a plurality of remote devices to one or more monitoring devices, and for communication of control signals from one or more control devices to the plurality of remote devices, the system comprising:

a plurality of remote interface units each coupled to a corresponding one of the remote devices; and a base unit coupled to the one or more monitoring devices and the one or more control devices;

wherein the plurality of remote interface units and the base unit are interconnected by fiber optic links to form a ring;

wherein each of the remote interface units supplies a video signal received from its corresponding remote device to the base unit for distribution to the one or more monitoring devices;

wherein the base unit supplies control signals from the one or more control devices to the plurality of remote interface units;

wherein the plurality of remote interface units comprises a first remote interface unit and a second remote interface unit;

wherein the base unit supplies the control signals to the first remote interface unit for distribution to the second remote interface unit; and wherein the first remote interface unit supplies the video signal received from its corresponding remote device to the second remote interface unit for distribution to the base unit;

wherein a master clock signal generated in the base unit is recovered from an incoming stream by a serial-to-parallel converter in each of the remote interface units and is embedded into an outgoing stream by a parallel-to-serial converter in each of the remote interface units, thereby providing synchronization within the system.

2. The system of claim 1 wherein the video signals comprise real-time video signals transmitted through the system, from the respective remote devices to the one or more monitoring devices, in an uncompressed format.

3. The system of claim 1 wherein associated with a given one of the video signals is at least one additional signal transmitted through the system between a given one of the remote devices and a corresponding one of the monitoring devices via the base unit.

4. The system of claim 3 wherein said at least one additional signal comprises an audio signal.

5. The system of claim 4 wherein said audio signal comprises an intercom signal.

6. The system of claim 3 wherein said at least one additional signal comprises a data signal.

7. The system of claim 1 wherein the ring carries a multiplexed signal stream comprising portions associated with respective ones of the remote interface units, and the remote interface units are configured to provide signals to and remove signals from their respective portions of the multiplexed signal stream.

8. The system of claim 7 wherein the multiplexed signal stream comprises a packet stream, with particular ones of the packets being associated with respective ones of the remote interface units.

9. The system of claim 7 wherein said multiplexed stream comprises flag information provided by the remote interface units and utilizable by the base unit to determine the location of a fault within the ring.

10. The system of claim 9 wherein the flag information comprises for a given one of a plurality of packets of the multiplexed stream a flag word comprising a plurality of flag bits indicative of whether or not respective ones of the remote interface units have read the given packet.

11. The system of claim 7 wherein said multiplexed stream comprises subaddress information utilizable to facilitate adaptation of the stream to accommodate varying numbers of remote interface units.

12. The system of claim 7 wherein the base unit routes the portions of the multiplexed stream associated with the respective remote interface units to respective ones of the monitoring devices.

13. The system of claim 1 wherein one or more of the remote devices comprise cameras and the control signals comprise pan/tilt/zoom controls for said cameras.

14. The system of claim 1 wherein at least one of the remote interface units comprises a built in test signal generator, the built in test signal generator being controlled by one or more control signals supplied to the remote interface unit from the base unit.

15. The system of claim 1 wherein at least one of the remote devices comprises a programmable cable equalizer, and programmable cable equalizer being controlled by one or more control signals supplied to the remote interface unit from the base unit.

16. The system of claim 1 wherein the remote interface units are configured so as to detect the presence of a fault in the ring.

17. The system of claim 16 wherein upon detection of a fault in the ring between first and second ones of the remote interface units, the first and second remote interface units switch the signal paths of the multiplexed stream in a manner that permits communication to be maintained between each of the remote interface units and the base unit in the presence of the fault.

18. The system of claim 1 wherein the fiber optic links comprise bi-directional links capable of supporting traffic in both directions on differing wavelengths.

19. A signal distribution method for use in a system for communication of video signals from a plurality of remote devices to one or more monitoring devices, and for communication of control signals from one or more control devices to the plurality of remote devices, the system comprising a plurality of remote interface units each coupled to a corresponding one of the remote devices, and a base unit coupled to the one or more monitoring devices and the one or more control devices, the method comprising the steps of:

interconnecting the plurality of remote interface units and the base unit by fiber optic links to faun a ring;

supplying video signals from the remote interface units to the base unit for distribution to the one or more monitoring devices;

supplying control signals from the one or more control devices to the plurality of remote interface units via the base unit;

wherein a given video signal is received by a given remote interface unit from its corresponding remote device;

wherein the plurality of remote interface units further comprises a second remote interface unit and the given remote interface unit;

wherein the base unit supplies the control signals to the given remote interface unit for distribution to the second remote interface unit; and wherein the given remote interface unit supplies the video signal received from its corresponding remote device to the second remote interface unit for distribution to the base unit wherein a master clock signal generated in the base unit is recovered from an incoming stream by a serial-to-parallel converter in each of the remote interface units and is embedded into an outgoing stream by a parallel-to-serial converter in each of the remote interface units, thereby providing synchronization within the system.

* * * * *